US012521997B2

(12) United States Patent
Kato

(10) Patent No.: US 12,521,997 B2
(45) Date of Patent: Jan. 13, 2026

(54) PRINTING APPARATUS

(71) Applicant: SEIKO EPSON CORPORATION, Tokyo (JP)

(72) Inventor: Kazuhisa Kato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 201 days.

(21) Appl. No.: 18/458,324

(22) Filed: Aug. 30, 2023

(65) Prior Publication Data

US 2024/0066888 A1 Feb. 29, 2024

(30) Foreign Application Priority Data

Aug. 31, 2022 (JP) ................................ 2022-138169

(51) Int. Cl.

| | |
|---|---|
| ***B41J 2/21*** | (2006.01) |
| ***B41J 2/15*** | (2006.01) |
| ***B41J 11/00*** | (2006.01) |
| ***B41J 29/393*** | (2006.01) |

(52) U.S. Cl.

CPC ............... *B41J 2/2142* (2013.01); *B41J 2/15* (2013.01); *B41J 11/0095* (2013.01); *B41J 29/393* (2013.01); *B41J 2029/3935* (2013.01)

(58) Field of Classification Search

CPC .. B41J 29/393; B41J 11/0095; B41J 2202/21; B41J 29/38; B41J 2/16579; B41J 2/2142; B41J 2/155; B41J 2/15; B41J 2029/3935

USPC .............................. 347/19, 14, 54, 42, 5, 37

See application file for complete search history.

(56) References Cited

U.S. PATENT DOCUMENTS

| | | | | |
|---|---|---|---|---|
| 8,939,666 B2 * | 1/2015 | Tamai | ................ | B65H 23/1882 400/583 |
| 2014/0078201 A1 * | 3/2014 | Mizutani | ............. | B41J 11/0024 347/14 |
| 2022/0063304 A1 | 3/2022 | Hayakawa et al. | | |

FOREIGN PATENT DOCUMENTS

| | | |
|---|---|---|
| JP | 2004-009474 A | 1/2004 |
| JP | 2022-038687 A | 3/2022 |

* cited by examiner

*Primary Examiner* — Jannelle M Lebron

(74) *Attorney, Agent, or Firm* — WORKMAN NYDEGGER

(57) ABSTRACT

A printing apparatus including a transport unit configured to transport a medium in a transport direction, a printing unit configured to form an image on the medium, and a reading unit extended in an extending direction intersecting the transport direction and configured to read the image formed on the medium, wherein the extending direction of the reading unit is inclined with respect to a width direction orthogonal to the transport direction. With the printing apparatus having such a configuration, it is possible to improve determination accuracy of an operation state of the printing unit.

7 Claims, 8 Drawing Sheets

PRINTING APPARATUS

The present application is based on, and claims priority from JP Application Serial Number 2022-138169, filed Aug. 31, 2022, the disclosure of which is hereby incorporated by reference herein in its entirety.

BACKGROUND

1. Technical Field

The present disclosure relates to a printing apparatus.

2. Related Art

In the past, various printing apparatuses have been used. Among them, there is a printing apparatus that includes a reading unit that reads an image formed on a medium and is capable of determining an operation state of a printing unit. For example, JP 2004-9474 A discloses a line ink-jet printer which includes a scanner unit for reading a print result and is capable of checking nozzle omission of a print head by reading the print result with the scanner unit. In addition, for example, JP 2022-38687 A discloses a recording device capable of checking nozzle omission of a head by forming a test pattern for checking nozzle omission on a sheet, and imaging the test pattern by an imaging unit while the sheet is reversely fed by an intermediate roller.

However, in an existing printing apparatus capable of determining an operation state of a printing unit, such as the line ink-jet printer disclosed in JP 2004-9474 A and the recording device disclosed in JP 2022-38687 A, there was a case where the operation state of the printing unit was erroneously determined when an image is read by a reading unit, due to instability of transport of a medium. This is because, in such a printing apparatus, information obtained from the reading unit does not include information about a transport direction of the medium. Note that the instability of the transport of the medium occurs when the medium slips with respect to a roller pair or the like that transports the medium due to contamination or deterioration over time of the roller pair.

SUMMARY

A printing apparatus of the present disclosure for solving the above-described problems includes a transport unit configured to transport a medium in a transport direction, a printing unit configured to form an image on the medium, and a reading unit extended in an extending direction intersecting the transport direction and configured to read the image formed on the medium, wherein the extending direction is inclined with respect to a width direction orthogonal to the transport direction.

DESCRIPTION OF EMBODIMENTS

Figure 1:
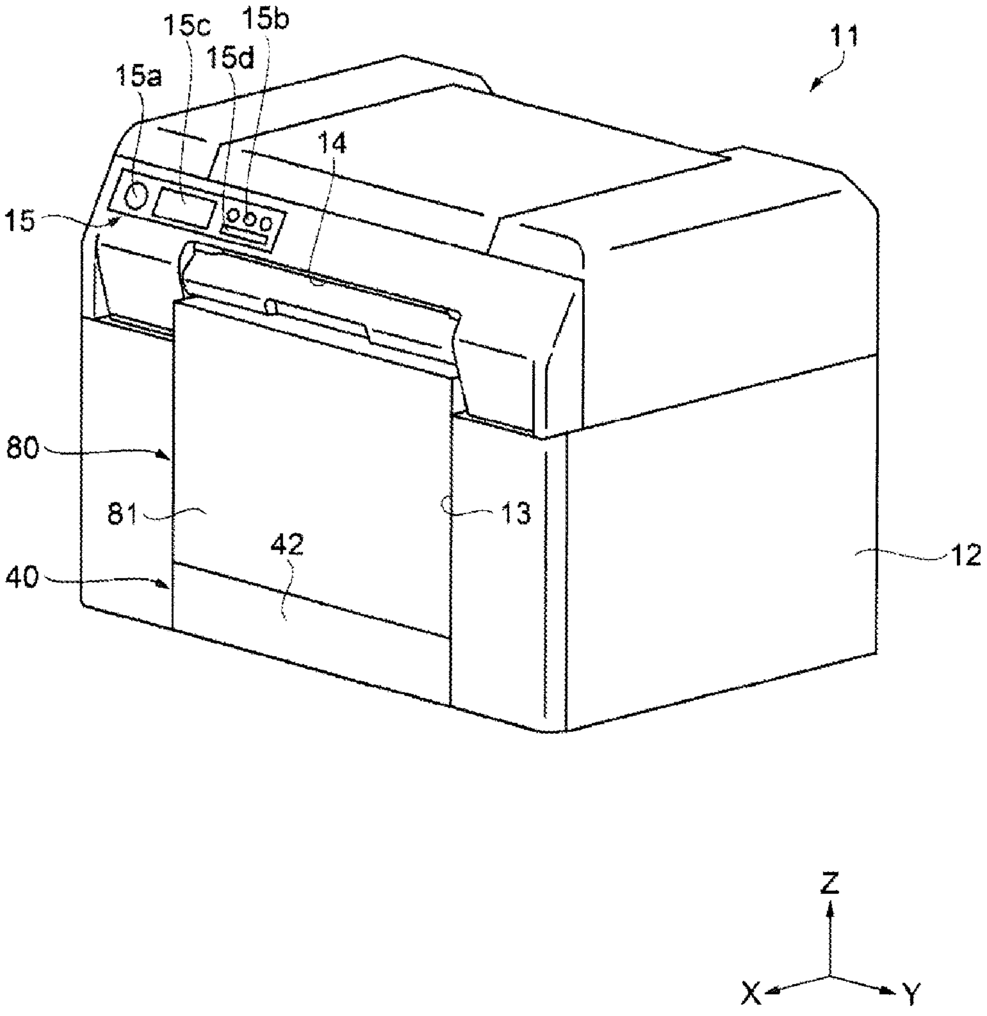
FIG. 1 is a perspective view of a printing apparatus according to an example of the present disclosure.

First, the present disclosure will be schematically described.

A printing apparatus of a first aspect of the present disclosure for solving the above-described problems includes a transport unit configured to transport a medium in a transport direction, a printing unit configured to form an image on the medium, and a reading unit extended in an extending direction intersecting the transport direction and configured to read the image formed on the medium, wherein the extending direction is inclined with respect to a width direction orthogonal to the transport direction.

According to the present aspect, the printing unit that forms the image on the medium and the reading unit that reads the image formed on the medium are included, and the extending direction of the reading unit is inclined with respect to the width direction. Therefore, it is possible to cause the printing unit to form a test pattern for determining an operation state of the printing unit, and to cause the reading unit to read the test pattern. Then, since read data by the reading unit includes information about the transport direction in addition to information about the width direction, it is also possible to determine instability of the transport of the medium, and when the transport of the medium is unstable, it is possible to correct the transport of the medium based on the read data. Therefore, it is possible to improve determination accuracy of the operation state of the printing unit.

The printing apparatus of a second aspect of the present disclosure is the first aspect, wherein the transport unit includes a first transport unit that transports the medium during image formation by the printing unit, and a second transport unit that transports the medium during image reading by the reading unit.

According to the present aspect, the transport unit includes the first transport unit that transports the medium during image formation by the printing unit, and the second transport unit that transports the medium during reading in the reading unit. For this reason, it is possible to transport the medium under optimum conditions at each of the time of image formation and the time of reading.

The printing apparatus of a third aspect of the disclosure is the second aspect, wherein as the transport direction, a first transport direction by the first transport unit during image formation by the printing unit and a second transport direction which is an opposite direction to the first transport direction are present, and the second transport unit transports the medium in the second transport direction during image reading by the reading unit.

According to the present aspect, during image reading by the reading unit, the second transport unit transports the medium in the second transport direction that is the opposite direction to the first transport direction during image formation. With such a configuration, it is possible to suppress an increase in size of the apparatus. In the case of such a configuration, since transport accuracy during image reading is likely to decrease, determination accuracy of the operation state of the printing unit tends to decrease, however, since the extending direction of the reading unit is inclined with respect to the width direction, it is possible to suppress the decrease in the determination accuracy of the operation state of the printing unit.

The printing apparatus of a fourth aspect of the present disclosure is the first or second aspect, including a processing unit, wherein the printing unit is configured to form an operation check image for checking operation of the printing unit as the image, and the processing unit generates operation check image data for the operation check image printed by the printing unit from the operation check image read by the reading unit.

According to the present aspect, the printing unit can form the operation check image, and the processing unit generates the operation check image data for the operation check image printed by the printing unit from the operation check image read by the reading unit. Therefore, the operation check image data can be automatically generated by the processing unit, and the operation state of the printing unit can be determined based on the operation check image data. Therefore, it is possible to reduce a load on a user for determining the operation state of the printing unit.

The printing apparatus of a fifth aspect of the present disclosure is the fourth aspect, wherein the printing unit is configured to form a transport accuracy check image for checking transport accuracy of the transport unit as the image, and the processing unit generates transport data from the transport accuracy check image read by the reading unit and corrects the operation check image data based on the transport data.

According to the present aspect, the printing unit can form the transport accuracy check image for checking the transport accuracy, and the processing unit generates the transport data from the transport accuracy check image read by the reading unit and corrects the operation check image data based on the transport data. For this reason, since the processing unit corrects the operation check image data while determining whether the transport of the medium is unstable during image reading or not from the transport accuracy check image, it is possible to correct the operation check image data even when the transport of the medium is unstable. Therefore, it is possible to accurately determine the operation state of the printing unit based on the corrected operation check image data.

The printing apparatus of a sixth aspect of the present disclosure is the fifth aspect, wherein the reading unit includes a reading element arranged in the extending direction, the transport accuracy check image includes, in the transport direction, a plurality of linear images extending in the width direction, and one of the linear images has a length readable by a plurality of the reading elements.

According to the present aspect, the reading unit includes the reading element arranged in the extending direction, the transport accuracy check image includes, in the transport direction, the plurality of linear images extending in the width direction, and one of the linear images has the length readable by the plurality of reading elements. With such a configuration, it is possible to determine whether the transport of the medium is unstable or not with high accuracy based on the transport accuracy check image.

The printing apparatus of a seventh aspect of the present disclosure is the fourth aspect, wherein the printing unit includes a plurality of nozzles that discharge ink onto the medium, and the operation check image includes a nozzle check pattern with which it is possible to check that the ink is discharged from each of the nozzles.

According to the present aspect, the printing unit includes the plurality of nozzles that discharge the ink onto the medium, and the operation check image includes the nozzle check pattern with which it is possible to check that the ink is discharged from each of the nozzles. For this reason, when the printing unit includes the plurality of nozzles, it is possible to determine, with high accuracy, presence or absence of nozzle omission which is a decrease in the operation state of the printing unit in which the ink is not appropriately discharged from the nozzle.

The printing apparatus of an eighth aspect of the present disclosure is the fourth aspect, including a determination unit configured to determine an operation state of the printing unit from the operation check image data.

According to the present aspect, the determination unit that determines the operation state of the printing unit from the operation check image data is included. For this reason, it is possible to cause the determination unit to automatically determine the operation state of the printing unit based on the operation check image data generated by the processing unit.

The printing apparatus of a ninth aspect of the present disclosure is the fourth aspect, including a memory unit configured to store transport data related to a transport condition of the transport unit, wherein the processing unit generates the operation check image data based on the transport data stored in the memory unit.

According to the present aspect, the memory unit that stores the transport data related to the transport condition of the transport unit is included, and the processing unit generates the operation check image data based on the transport data. Therefore, the operation check image data can be generated with high accuracy based on the transport data stored in the memory unit.

Figure 2:
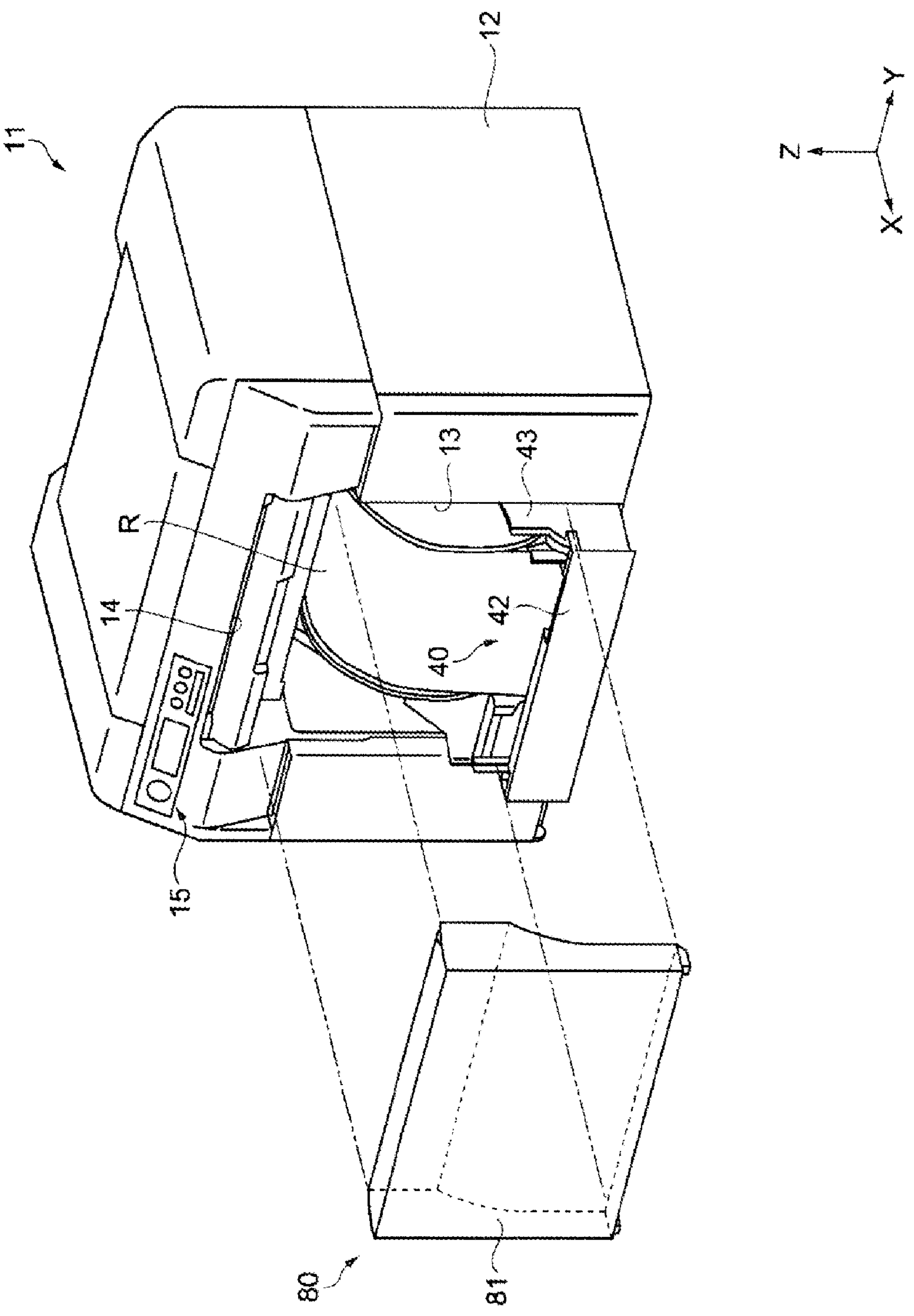
FIG. 2 is a perspective view of the printing apparatus of FIG. 1, and is a diagram illustrating a state in which a cutting waste accommodation unit is detached.

An exemplary embodiment according to the present disclosure will be specifically described below with reference to the accompanying drawings. First, an outline of a printing apparatus 11 according to an example of the present disclosure will be described with reference to FIGS. 1 to 3. The printing apparatus 11 of the present exemplary embodiment is an ink-jet printing apparatus that discharges ink as liquid onto a medium M to perform printing. The medium M is, for example, roll paper R, and is a long medium wound in a roll shape.

In the following drawings, the printing apparatus 11 is treated as being in a state placed on a horizontal plane. As directions along the horizontal plane, the drawings treat a front-back direction of the printing apparatus 11 as a direction along an X-axis and a left-right direction (or a width direction) as a direction along a Y-axis. Furthermore, a direction vertical (up-down direction) to the horizontal plane is treated as a direction along a Z-axis. In addition, a +X direction is treated as a forward direction, a −X direction as a backward direction, a +Y direction as a right direction, a −Y direction as a left direction, a +Z direction as an upward direction and a −Z direction as a downward direction.

The printing apparatus 11 includes a cuboid housing 12 and a body frame 16 that supports each portion of the printing apparatus 11. The housing 12 includes an opening portion 13 opening to a front face. In addition, a discharge port 14 from which the medium M that is subjected to printing and cutting is discharged is installed at the housing 12. Note that the discharge port 14 constitutes a discharge unit 28.

The printing apparatus 11 includes a storage unit 40 that stores the roll paper R and from which the stored roll paper R is fed out. The storage unit 40 is installed such that the storage unit 40 can be pulled from the housing 12 through the opening portion 13 in the forward direction. The storage unit 40 includes a front plate portion 42 that, when stored in the housing 12, constitutes part of an outer packaging of the printing apparatus 11 and a pair of support walls 43 rotatably supporting the roll paper R.

Below the discharge unit 28, a box-shaped cutting waste accommodation unit 80 is provided accommodating cutting waste of the medium M produced by cutting performed by a cutting unit 27. The cutting waste accommodation unit 80 is detachably installed at a front face of the housing 12, forward of the roll paper R. The cutting waste accommodation unit 80 is attached to the housing 12, sealing the opening portion 13. The cutting waste accommodation unit 80 includes an outer wall 81 that, when attached to the housing 12, constitutes part of the outer packaging of the printing apparatus 11.

When the cutting waste accommodation unit 80 is detached from the housing 12, the storage unit 40 can be pulled out of the housing 12. With the storage unit 40 pulled out of the housing 12, the roll paper R is replaced.

Further, an operation unit 15 for operating the printing apparatus 11 is provided at the front face of the housing 12. The operation unit 15 is a panel that is long in the direction along the Y-axis and is provided with a power button 15*a* operated when turning the printing apparatus 11 on or off, an input button 15*b* with which various types of operation information can be input and an operation panel 15*c* provided with a display of an operation status of the printing apparatus 11, for example, or an operation button for the printing apparatus 11. The operation panel 15*c* is a touch-screen panel. Additionally, a speaker 15*d* is provided emitting sound to an exterior.

Figure 3:
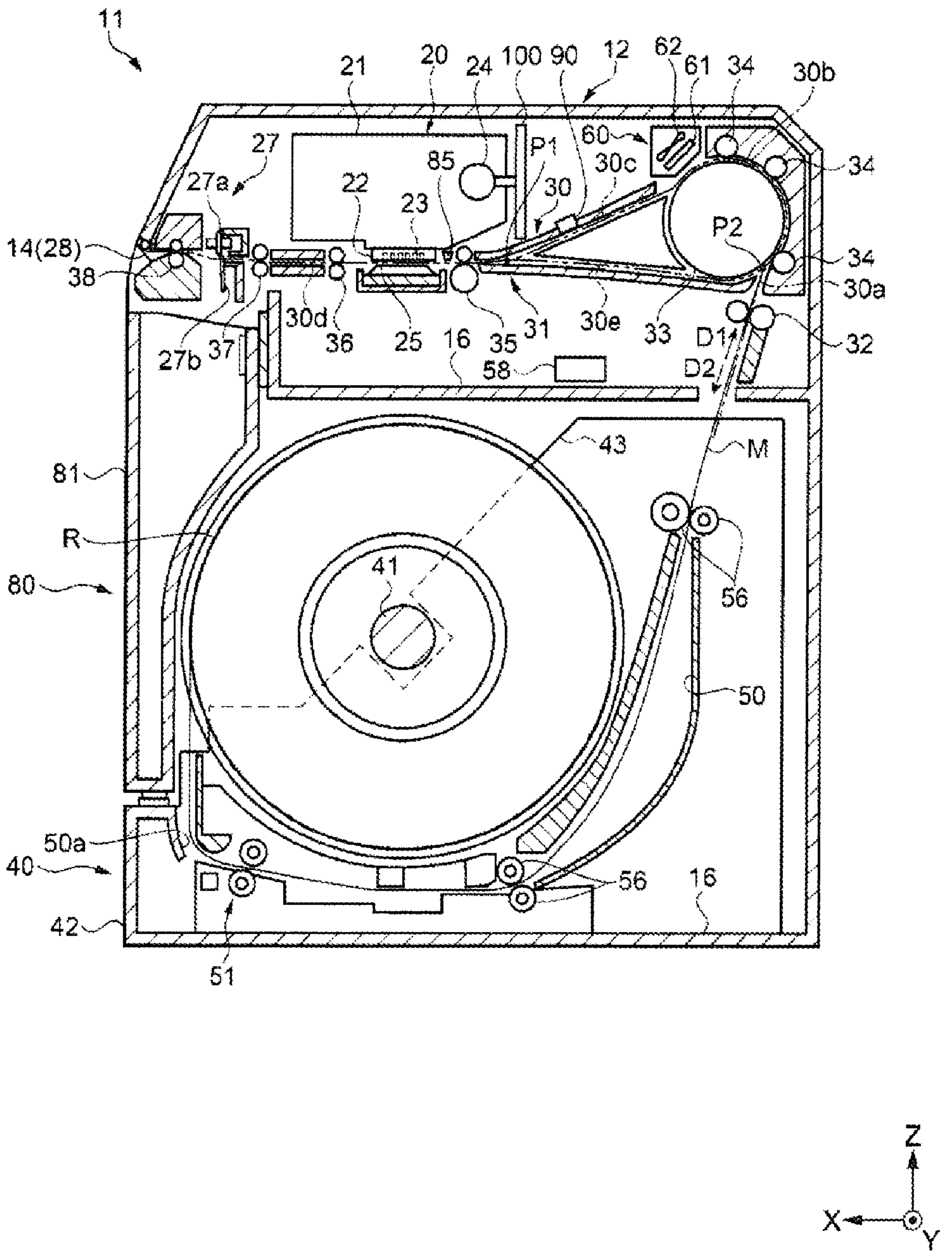
FIG. 3 is a diagram illustrating an internal configuration of the printing apparatus of FIG. 1.

As illustrated in FIG. 3, the printing apparatus 11 includes a transport path 30 illustrated by a double dot dashed line in the drawing on which the medium M is transported. The printing apparatus 11 includes a transport unit 31 that transports the medium M along the transport path 30, a printing unit 20 that performs recording on the medium M and the cutting unit 27 that cuts the medium M.

The printing unit 20 forms an image on the medium M transported from the storage unit 40. The printing unit 20 includes a head 22 having a nozzle 23 that discharges ink toward the medium M and a carriage 21 on which the head 22 is mounted. The carriage 21 is supported by a guide frame 100 extending along the Y-axis and a guide shaft 24 attached to the guide frame 100 and extending along the Y-axis. The carriage 21 is movable along the guide shaft 24 with a drive source such as a motor. That is, the carriage 21 is capable of reciprocating in the direction along the Y-axis. A support unit 25 supporting the medium M is provided at a position opposite the head 22.

By discharging ink while reciprocating together with the carriage 21 in a width direction of the medium M, the head 22 forms an image on the medium M supported by the support unit 25. In the present exemplary embodiment, a serial head-type printing unit in which the head 22 reciprocates in the width direction was given as an example of the printing unit 20, but the printing unit 20 may be a line head-type recording unit in which the head 22 is fixedly arranged extending in the width direction.

The transport path 30 is a space in which the medium M can move and is configured by a plurality of members. The transport path 30 runs from the storage unit 40 that is located furthest upstream and from which the roll paper R is fed out, to the discharge unit 28 (discharge port 14) located furthest downstream. The printing unit 20, the support unit 25 and the like are disposed on the transport path 30.

The cutting unit 27 is located downstream from the support unit 25 and upstream from the discharge port 14. The cutting unit 27 of the present exemplary embodiment includes a movable blade 27*a* capable of reciprocating in the width direction (left-right direction) and a fixed blade 27*b* that does not move. The movable blade 27*a* is provided above the transport path 30 and the fixed blade 27*b* is provided below the transport path 30. The cutting unit 27 cuts the medium M at a cutting position across the width direction. The cutting position is a position of a blade edge of the fixed blade 27*b*.

The transport path 30 of the exemplary embodiment includes, from upstream in the transport direction of the medium M, a first path 30*a* on which the medium M fed out from the roll paper R is transported, a curved path 30*b* on which the medium M is transported while curving, a second path 30*c* on which the medium M is transported toward the head 22 (support unit 25) and a third path 30*d* on which the medium M is transported from downstream of the support unit 25 toward the discharge unit 28.

Furthermore, the transport path 30 includes an inversion path 30*e*. The inversion path 30*e* is a passage coupling a branch point P1 where the inversion path 30*e* branches from the second path 30*c* and a merge point P2 where the inversion path 30*e* merges into the first path 30*a*. In the transport direction of the medium M transported via the curved path 30*b*, the merge point P2 is located upstream from the branch point P1. That is, the inversion path 30*e* merges with an upper stream side of the curved path 30*b*. The inversion path 30*e* is a path for inverting the cut-sheet medium M and performing recording on both surfaces of the medium M.

The transport unit 31 transports the medium M along the transport path 30 from the storage unit 40, past the printing unit 20, to the cutting unit 27 and the discharge unit 28. The transport unit 31 includes a feed roller pair 32 provided on the first path 30*a*, a middle roller 33 forming the curved path 30*b*, a driven roller 34 corresponding to a transport roller disposed along an outer circumferential surface of the middle roller 33 on the curved path 30*b* and an upstream transport roller pair 35 provided on the second path 30*c*.

The driven roller 34 is provided so as to freely rotate and is driven to rotate with the medium M interposed between the driven roller 34 and the middle roller 33. In the present exemplary embodiment, a plurality of the driven rollers 34 are provided. Accordingly, the inverted medium M can be smoothly transported along the curved path 30*b*.

The transport unit 31 further includes, on the third path 30*d*, a downstream first transport roller pair 36, a downstream second transport roller pair 37 and a downstream third transport roller pair 38. The downstream second transport roller pair 37 is located upstream from the cutting unit 27. The downstream third transport roller pair 38 is located downstream from the cutting unit 27.

Here, a configuration of the storage unit 40 will be described. The storage unit 40 has the roll paper R rotatably supported via a support shaft 41 extending in a width direction of the housing 12. The support shaft 41 is configured to be capable of being rotationally driven in both forward and reverse directions. Thus, the roll paper R is driven to rotate in both the forward and reverse directions via the support shaft 41. Furthermore, the storage unit 40 is provided with a roll paper transport track 50 for transporting the medium M fed out from the roll paper R toward the first path 30*a*. The roll paper transport track 50 is part of the transport path 30.

The roll paper transport track 50 extends downward from a front side of the roll paper R that is supported via the support shaft 41 and then bends in the backward direction, goes around the downward direction and backward direction of the roll paper R and extends to a position higher than the roll paper R, moving in the upward direction to the first path 30*a*. Further, the roll paper transport track 50 has a bent portion 50*a* bending at substantially a right angle at an upstream end portion of the roll paper transport track 50, that is, at a position forward and diagonally downward of the roll paper R on the roll paper transport track 50. A decurling mechanism 51 is provided downstream of the bent portion 50*a* of the roll paper transport track 50, the decurling mechanism 51 performing decurling that corrects roll memory of the medium M fed out from the roll paper R.

Downstream from the decurling mechanism 51 on the roll paper transport track 50, a roll paper transport roller pair 56 imparting transport force to the roll paper R is installed with suitable spacing. When the roll paper transport roller pair 56 drives and rotates, the medium M is fed out from the roll paper R and transported to the first path 30*a*. The roll paper transport roller pair 56 is part of the transport unit 31. The roll paper transport roller pair 56, the feed roller pair 32, the middle roller 33, the driven roller 34, the upstream transport roller pair 35, the downstream first transport roller pair 36, the downstream second transport roller pair 37 and the downstream third transport roller pair 38 transport the medium M by rotating in a state where the medium M is between the rollers.

Each roller of the transport unit 31 is driven to rotate forward to transport the medium M from upstream to downstream, and is driven to rotate backward to transport the medium M from downstream to upstream. In the present exemplary embodiment, a direction corresponding to the transport direction and going downstream along the transport path 30 is referred to as a forward feeding direction D1 and a direction going upstream is referred to as a backward feeding direction D2. Note that in the present specification, the "transport direction" means the "forward feeding direction D1" unless otherwise specified, but may include both the "forward feeding direction D1" and the "backward feeding direction D2" when otherwise specified.

The printing apparatus 11 includes a heating unit 60 for heating the medium M being transported. The heating unit 60 is positioned facing the middle roller 33 installed on the curved path 30*b*. The heating unit 60 is installed immediately downstream of the furthest downstream driven roller 34 among the three driven rollers 34. The heating unit 60 is configured to correct a curl memory of the medium M. The heating unit 60 of the present exemplary embodiment includes a heater 61 generating heat and a fan 62 blowing the heat generated by the heater 61 onto the medium M.

A detection unit 85 capable of detecting a tip portion of the medium M being transported is provided upstream of the head 22. In the present exemplary embodiment, the detection unit 85 is disposed between the head 22 and the upstream transport roller pair 35 on the transport path 30. The detection unit 85 is, for example, an optical sensor and includes a light emitting unit capable of emitting light and a light receiving unit capable of receiving light. The light emitting unit emits light downward of the optical sensor and the light receiving unit receives reflected light reflected by the medium M. The light emitting unit is configured by a light emitting diode (LED), a laser light emitting element and the like. In addition, the light receiving unit is configured by a phototransistor, a photo IC and the like. The light receiving unit acquires a received amount of received light as a voltage value. Additionally, a threshold value is set for the voltage value as the received amount for determining presence or absence of the medium M, and the presence or absence of the medium M is determined based on the threshold value.

This enables detection of a tip portion of the medium M.

In addition, the printing apparatus 11 includes a reading unit 90 on the transport path 30 extending from the storage unit 40, past the printing unit 20, to the discharge unit 28. In the present exemplary embodiment, the reading unit 90 is disposed on the second path 30*c* between the curved path 30*b* and the head 22 of the printing unit 20. Here, the second path 30*c* is inclined downward from an upper end portion of the curved path 30*b* toward an end surface in the −Z direction of the head 22 which is a discharge surface where ink is discharged from the head 22 of the printing unit 20. Then, at least part of the reading unit 90 is disposed between the upper end portion of the curved path 30*b* and the discharge surface of the head 22 in a height direction. In the present exemplary embodiment, the reading unit 90 is disposed between the upper end portion of the curved path 30*b* and the discharge surface of the head 22. Accordingly, it is possible to suppress a dimension of the printing apparatus 11 in the height direction.

The reading unit 90 images the medium M on which an image is formed. For example, the reading unit 90 images a test pattern TP illustrated in FIG. 5 printed by the printing unit 20. The reading unit 90 is, for example, a contact optical sensor (CIS: Contact Image Sensor). The reading unit 90 is a line sensor, and includes a photosensor, a light source unit, a lens, and the like. The reading unit 90 can image a region in the width direction of the medium M. In addition, since the reading unit 90 is disposed at a position further away from the discharge unit 28, influence of ambient light is small, and it is possible to ensure the imaging function. Note that the disposition of the reading unit 90 on the transport path 30 will be described in detail later.

Figure 5:
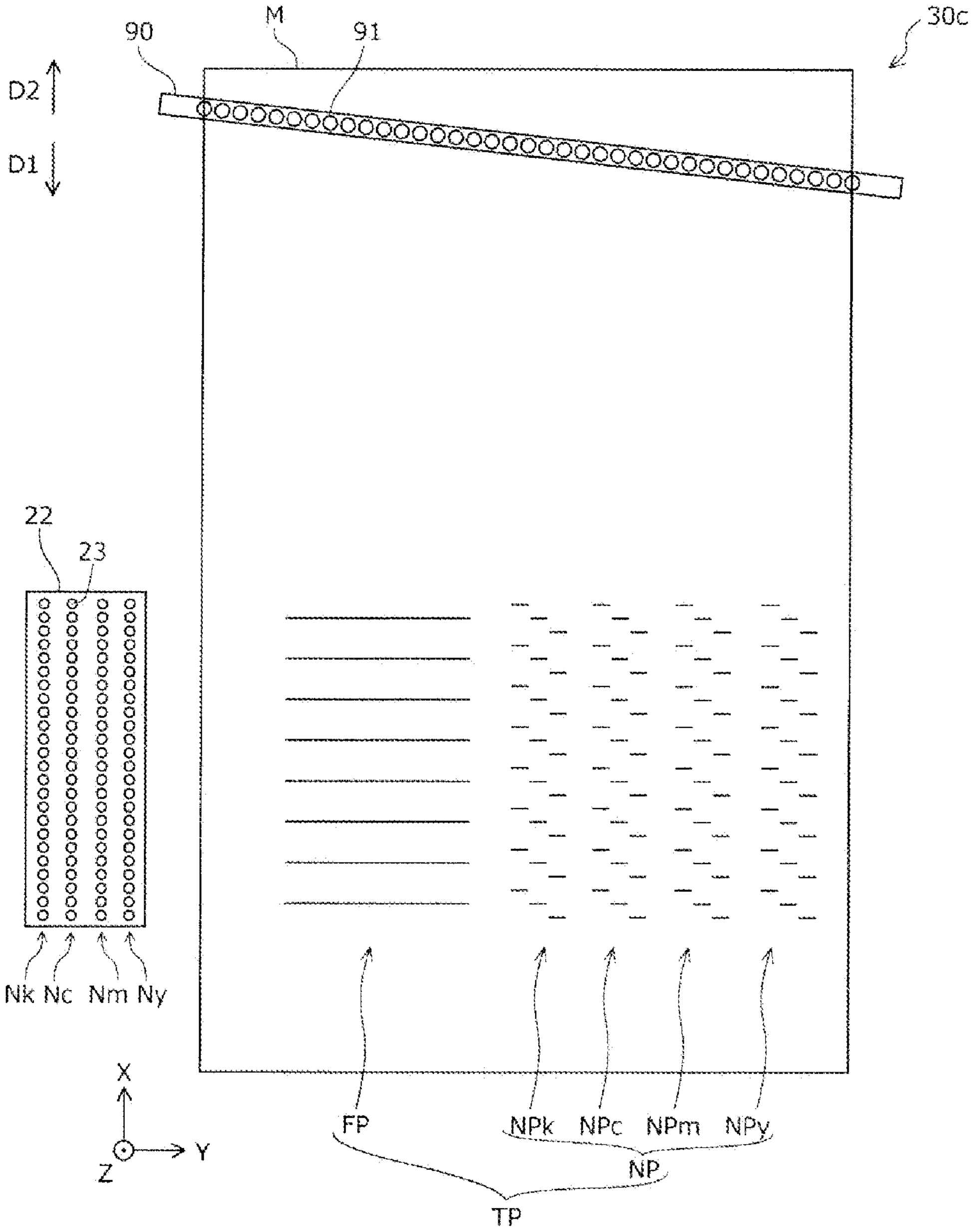
FIG. 5 is a conceptual diagram illustrating a test pattern printed by the printing apparatus of FIG. 1 in correspondence with a position of a head and an arrangement of a reading unit.

Here, the test pattern TP has a nozzle check pattern NP illustrated in FIG. 5 that is formed by causing the nozzle 23 of the printing unit 20 to discharge ink and that is a set of a plurality of straight lines corresponding to the respective nozzles 23. A discharge state of the nozzle 23 can be checked with the printed test pattern TP. In the present exemplary embodiment, image data of the test pattern TP is acquired by the reading unit 90, and a control unit 58 determines whether the discharge state of the nozzle 23 is good or bad based on the acquired image data. When the control unit 58 determines that the discharge state of the nozzle 23 is good, a printing process is performed. On the other hand, when the discharge state of the nozzle 23 is determined to be bad due to nozzle omission or the like, a maintenance process such as cleaning can be performed. Here, the "nozzle omission" refers to a state in which ink is not appropriately discharged from the nozzle 23. Note that a detailed specific example of the test pattern TP formed by the printing apparatus 11 of the present example will be described later.

Figure 4:
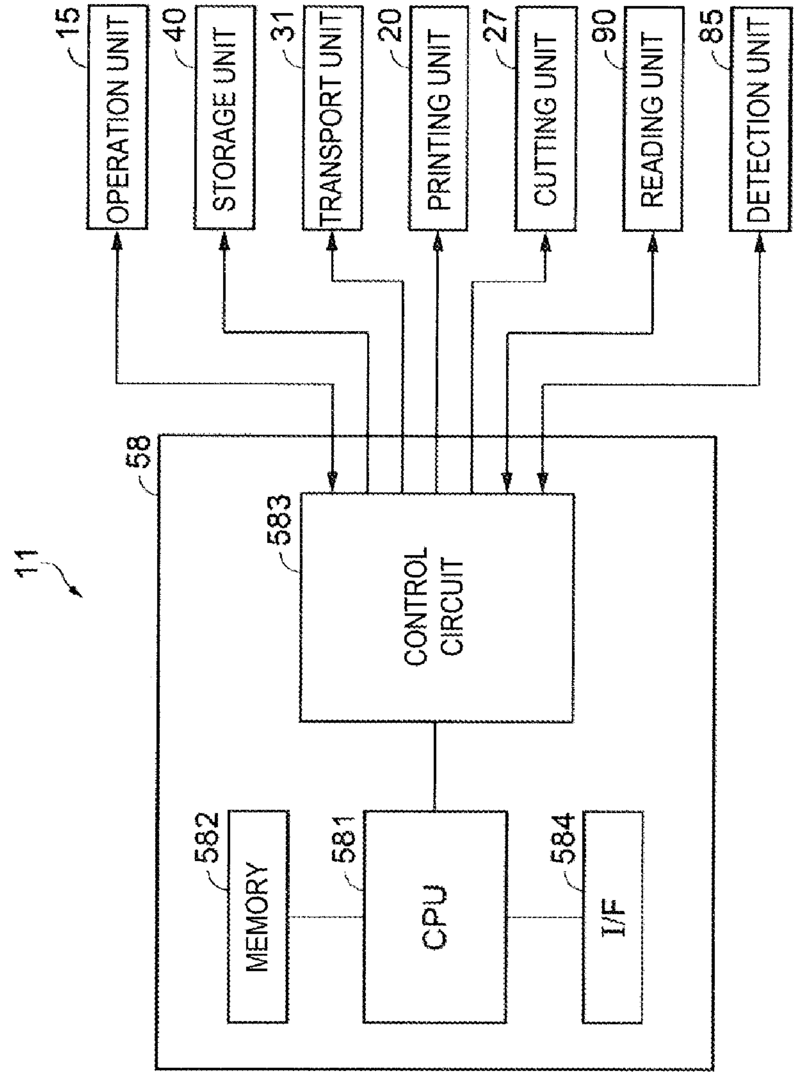
FIG. 4 is a block diagram illustrating an electrical configuration of the printing apparatus of FIG. 1.

Next, a configuration of the control unit 58 of the printing apparatus 11 will be described with reference to FIG. 4. As illustrated in FIG. 4, the printing apparatus 11 includes the control unit 58 that controls various types of operation performed by the printing apparatus 11. The control unit 58 is electrically coupled to the operation unit 15, the storage unit 40, the transport unit 31, the printing unit 20, the cutting unit 27, the reading unit 90 and the detection unit 85.

The control unit 58 includes a CPU 581, a memory 582, a control circuit 583 and an interface (I/F) 584. The CPU 581 is an arithmetic processing device. The memory 582 is a storage device ensuring a region for storing programs of the CPU 581, a working region and the like and includes a storage element such as a RAM or EEPROM.

In the control unit 58, when print data and the like is acquired from outside an information processing terminal or the like via the I/F 584, the CPU 581 controls various drive units and the like. Note that each of the feed roller pair 32, the middle roller 33, the upstream transport roller pair 35, the downstream first transport roller pair 36, the downstream second transport roller pair 37, the downstream third transport roller pair 38, and the roll paper transport roller pair 56 constituting the transport unit 31 is configured to be capable of being drive-controlled.

Next, a disposition of the reading unit 90 on the transport path 30 in the printing apparatus 11 of the present example, and a specific example of the test pattern TP formed by the printing apparatus 11 of the present example will be described with reference to FIGS. 5 to 8. First, with reference to FIGS. 7 and 8, regarding a printing apparatus of a reference example as an example of an existing printing apparatus including the reading unit 90 for reading an image formed on the medium M and capable of determining nozzle omission as an operation state of the printing unit 20, a disposition of the reading unit 90 on the transport path 30, and the test pattern TP formed by the printing apparatus of the reference example will be described. Note that the printing apparatus of the reference example is similar to the printing apparatus 11 of the present example in terms of configurations other than the disposition of the reading unit 90 on the transport path 30, and the formable test pattern TP.

Figure 7:
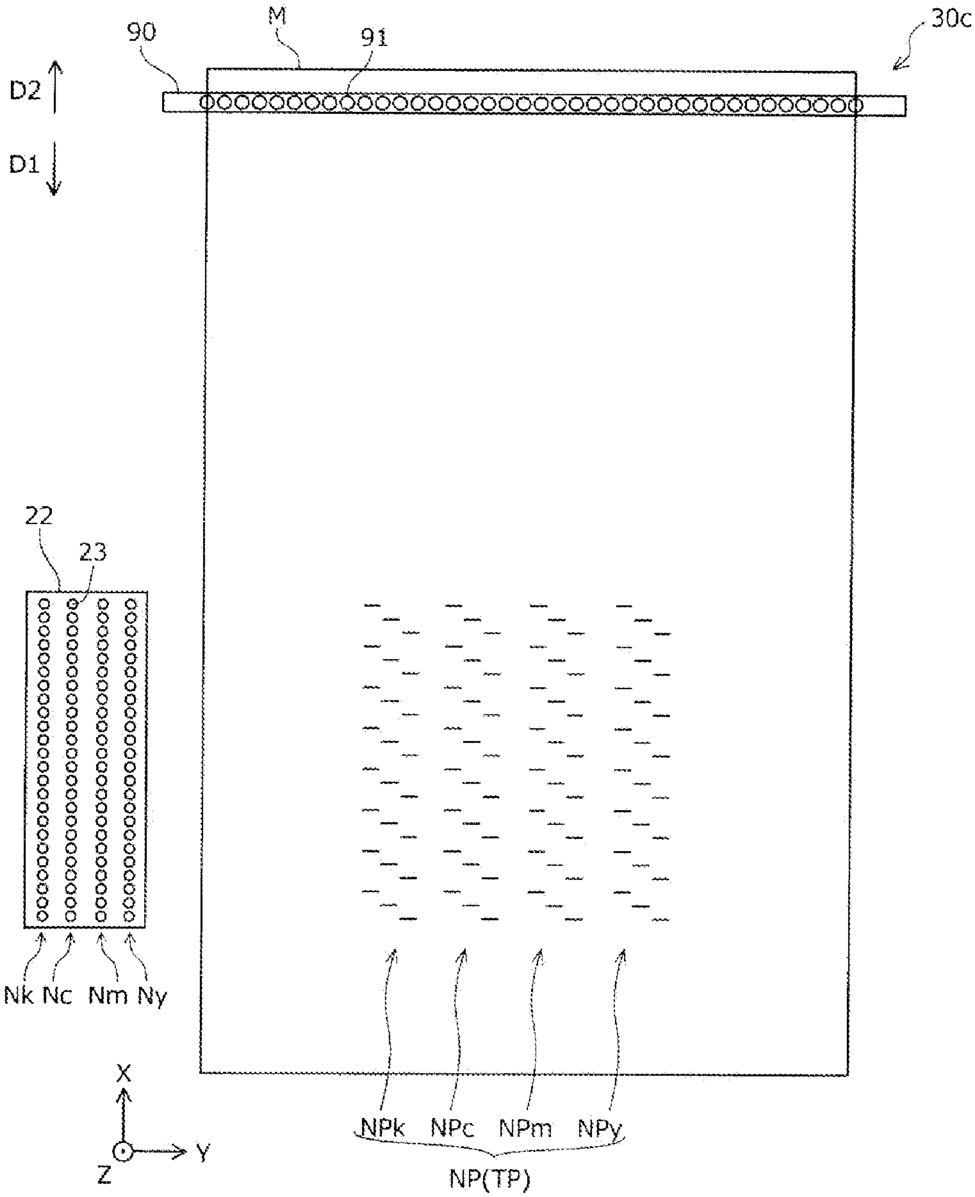
FIG. 7 is a conceptual diagram illustrating a test pattern printed by a printing apparatus of a reference example in correspondence with a position of a head and an arrangement of a reading unit.

As illustrated in FIG. 7, in the printing apparatus of the reference example, the reading unit 90 is extended along a width direction (the Y-axis direction) orthogonal to the forward feeding direction D1 and the backward feeding direction D2 as a transport direction. In other words, in the reading unit 90, a plurality of reading elements 91 are arranged along the width direction orthogonal to the forward feeding direction D1 and the backward feeding direction D2 as the transport direction. In addition, the printing apparatus of the reference example includes the head 22 having a similar configuration to that of the printing apparatus 11 of the present example. The head 22 includes a nozzle row Nk of the nozzles 23 that discharge a black ink, a nozzle row Nc of the nozzles 23 that discharge a cyan ink, a nozzle row Nm of the nozzles 23 that discharge a magenta ink and a nozzle row Ny of the nozzles 23 that discharge a yellow ink.

The printing apparatus of the reference example prints the test pattern TP as illustrated in FIG. 7 by moving the printing unit 20 in the width direction along the Y-axis direction and causing ink to be discharged from each nozzle 23 of the head 22 at desired timing. The test pattern TP formed by the printing apparatus of the reference example is a nozzle check pattern NP including a linear pattern NPk discharged from the nozzles 23 of the nozzle row Nk, a linear pattern NPc discharged from the nozzles 23 of the nozzle row Nc, a linear pattern NPm discharged from the nozzles 23 of the nozzle row Nm, and a linear pattern NPy discharged from the nozzles 23 of the nozzle row Ny. In the nozzle check pattern NP, the linear patterns are formed in each of which a stepwise shape is formed for every three lines corresponding to all the nozzles 23 used in printing. Then, under the control of the controller 58, while transporting the medium M in the backward feeding direction D2, the reading unit 90 is caused to read each of the linear pattern NPk, the linear pattern NPc, the linear pattern NPm and the linear pattern NPy. Then, based on a read result, the control unit 58 determines presence or absence of nozzle omission, and when there is nozzle omission, determines which nozzle 23 corresponds to the nozzle omission.

Figure 8:
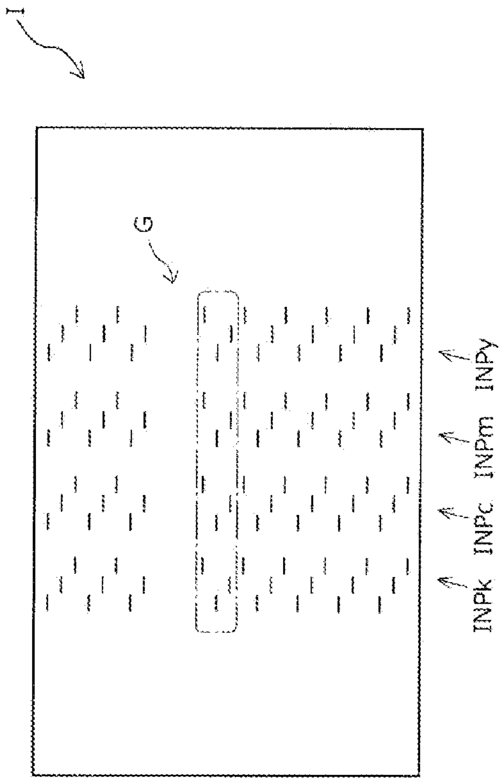
FIG. 8 is a diagram conceptually illustrating a read image in a case where a transport failure occurs when the test pattern of FIG. 7 is read by the reading unit.

Here, FIG. 8 is a diagram conceptually illustrating a read image I in a case where the medium M slips with respect to the middle roller 33 constituting the transport unit 31 and a transport failure occurs when the test pattern TP of FIG. 7 is read by the reading unit 90. In FIG. 8, a read image of the linear pattern NPk corresponds to a linear read image INPk, a read image of the linear pattern NPc corresponds to a linear read image INPc, a read image of the linear pattern NPm corresponds to a linear read image INPm, and a read image of the linear pattern NPy corresponds to a linear read image INPy. Note that in the test pattern TP of FIG. 7, no nozzle omission occurs. As illustrated in FIG. 8, in a case where a transport failure occurs when the test pattern TP is read by the reading unit 90, a gap G may occur in the read image I. This is because reading timing of the test pattern TP in the reading unit 90 is shifted due to the transport failure. For this reason, when the control unit 58 determines nozzle omission based on the read image I illustrated in FIG. 8, nozzle omission may be determined for the nozzles 23 corresponding to the linear read image INPk, the linear read image INPc, the linear read image INPm and the linear read image INPy surrounded by an alternate long and short dash line in the figure, even though nozzle omission does not originally occur.

On the other hand, as illustrated in FIG. 5, in the printing apparatus 11 of the present example, an extending direction of the reading unit 90 is inclined with respect to a width direction orthogonal to the forward feeding direction D1 and the backward feeding direction D2 as the transport direction. In other words, in the reading unit 90, a plurality of the reading elements 91 are arranged in a direction inclined with respect to the width direction orthogonal to the forward feeding direction D1 and the backward feeding direction D2 as the transport direction. In addition, similar to the printing apparatus of the reference example, the head 22 of the printing apparatus 11 of the present example includes the nozzle row Nk of the nozzles 23 that discharge a black ink, the nozzle row Nc of the nozzles 23 that discharge a cyan ink, the nozzle row Nm of the nozzles 23 that discharge a magenta ink and the nozzle row Ny of the nozzles 23 that discharge a yellow ink.

Similar to the printing apparatus of the reference example, the printing apparatus 11 of the present example prints the test pattern TP as illustrated in FIG. 5 by moving the printing unit 20 in the width direction along the Y-axis direction and causing ink to be discharged from each nozzle 23 of the head 22 at desired timing. The test pattern TP formed by the printing apparatus 11 of the present example has a transport accuracy check image FP for checking transport accuracy of the transport unit 31, in addition to the nozzle check pattern NP including the linear patterns NPk discharged from the respective nozzles 23 of the nozzle row Nk, the linear patterns NPc discharged from the respective nozzles 23 of the nozzle row Nc, the linear patterns NPm discharged from the respective nozzles 23 of the nozzle row Nm, and the linear patterns NPy discharged from the respective nozzles 23 of the nozzle row Ny. Here, in the nozzle check pattern NP, the linear patterns are formed in a stepwise shape for every three lines corresponding to all the nozzles 23 used in printing. On the other hand, in the transport accuracy check image FP, for example, a linear pattern that is long in the width direction is formed by every third nozzle 23 of the nozzle row Nk. Then, under the control of the control unit 58, while transporting the test pattern TP in the backward feeding direction D2, the reading unit 90 is caused to read each of the linear patterns NPk, the linear patterns NPc, the linear patterns NPm and the linear patterns NPy, and is further caused to read the transport accuracy check image FP. Then, based on a read result, the control unit 58 determines presence or absence of nozzle omission, and when there is nozzle omission, determines which nozzle 23 corresponds to the nozzle omission.

Figure 6:
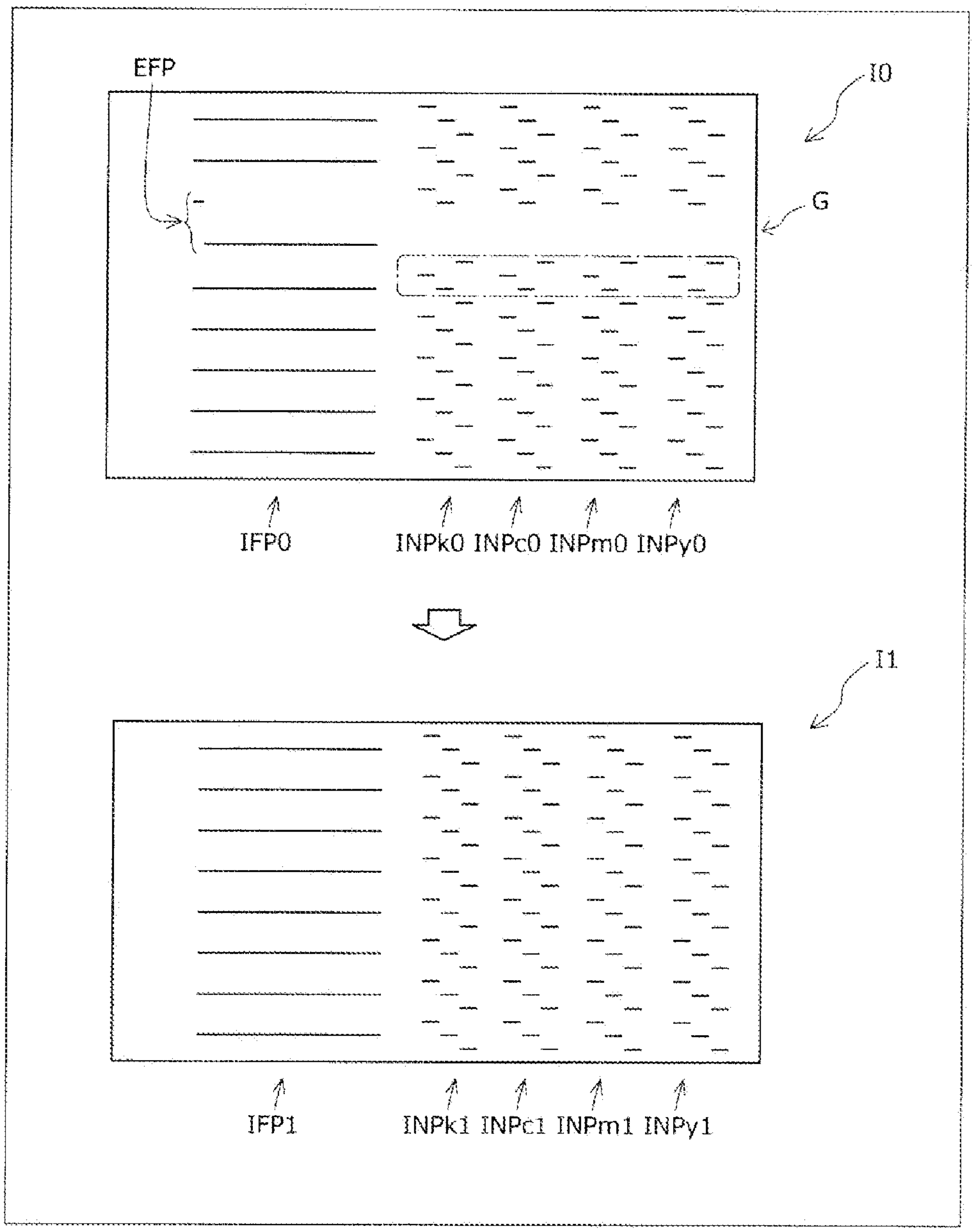
FIG. 6 is a diagram conceptually illustrating a read image in a case where a transport failure occurs when the test pattern of FIG. 5 is read by the reading unit and a corrected image thereof.

Here, a diagram of a read image I0 corresponding to an upper diagram of FIG. 6 is a diagram conceptually illustrating the read image I in a case where the medium M slips with respect to the middle roller 33 constituting the transport unit 31 and a transport failure occurs when the test pattern TP of FIG. 5 is read by the reading unit 90. In the diagram of the read image I0, a read image of the linear pattern NPk corresponds to a linear read image INPk0, a read image of the linear pattern NPc corresponds to a linear read image INPc0, a read image of the linear pattern NPm corresponds to a linear read image INPm0, and a read image of the linear pattern NPy corresponds to a linear read image INPy0, and further, a read image of the transport accuracy check image FP corresponds to a transport accuracy check read image IFP0. Note that in the test pattern TP of FIG. 5, no nozzle omission occurs. Here, also in the printing apparatus 11 of the present example, similar to the printing apparatus of the reference example, in a case where a transport failure occurs when the test pattern TP is read by the reading unit 90, the gap G may occur in the read image I0.

However, as described above, in the printing apparatus 11 of the present example, the transport accuracy check image FP is read in addition to the nozzle check pattern NP. In a case where a transport failure occurs when the test pattern TP is read by the reading unit 90, in the printing apparatus 11 of the present example, the transport accuracy check image FP is read by the reading unit 90 as an error image EFP. This is because, in the printing apparatus 11 of the present example, the extending direction of the reading unit 90 is inclined with respect to the width direction orthogonal to the transport direction, and thus a reading result of the reading unit 90 includes not only information about the width direction but also information about the transport direction. Therefore, in the printing apparatus 11 of the present example, the read image I0 is corrected based on information about the error image EFP under the control of the control unit 58. To be specific, the control unit 58 calculates a slip amount of the medium M with respect to the middle roller 33 based on the information about the error image EFP, generates a correction formula based on the slip amount, and corrects the linear read image INPk0, the linear read image INPc0, the linear read image INPm0 and the linear read image INPy0.

A lower diagram of FIG. 6 is a diagram of a corrected read image I1 obtained by correcting the read image I0. Under the control of the controller 58, based on the error image EFP, a correction formula is generated for correcting the uncorrected transport accuracy check read image IFP0 to obtain transport accuracy check read image IFP1 after the correction in correspondence with the slip amount of the medium M with respect to the middle roller 33. Then, based on the correction formula, the linear read image INPk0 is corrected to obtain the linear read image INPk1, the linear read image INPc0 is corrected to obtain the linear read image INPc1, the linear read image INPm0 is corrected to obtain the linear read image INPm1, and the linear read image INPy0 is corrected to obtain the linear read image INPy1. As described above, nozzle omission does not occur in the test pattern TP of FIG. 5, and it is clearly illustrated that nozzle omission does not occur in the corrected read image I1 as illustrated in the lower diagram of FIG. 6.

Here, once summarized, the printing apparatus 11 of the present example includes the transport unit 31 that transports the medium M in the forward feeding direction D1 and the backward feeding direction D2 as the transport direction and is configured with the roll paper transport roller pair 56, the feed roller pair 32, the middle roller 33, the driven roller 34, the upstream transport roller pair 35, the downstream first transport roller pair 36, the downstream second transport roller pair 37, the downstream third transport roller pair 38, and the like. Further, the printing apparatus 11 of the present example includes the printing unit 20 that forms an image on the medium M. In addition, the printing apparatus 11 of the present example includes the reading unit 90 that is extended in the extending direction intersecting the transport direction and reads the image formed on the medium M. Then, the extending direction of the reading unit 90 is inclined with respect to the width direction orthogonal to the transport direction.

As described above, the printing apparatus 11 of the present example includes the printing unit 20 that forms an image on the medium M and the reading unit 90 that reads the image formed on the medium M, and the extending direction of the reading unit 90 is inclined with respect to the width direction. Therefore, it is possible to cause the printing unit 20 to form the test pattern TP for determining an operation state of the printing unit 20, and to cause the reading unit 90 to read the test pattern TP. Then, since data read by the reading unit 90 includes information about the transport direction in addition to information about the width direction, it is also possible to determine instability of transport of the medium M and when the transport of the medium is unstable, it is possible to correct the transport of the medium M based on the read image I0 which is the read data. Therefore, in the printing apparatus 11 of the present example, determination accuracy of the operation state of the printing unit 20 is improved.

In addition, the printing apparatus 11 of the present example includes, as the transport unit 31, the upstream transport roller pair 35, the downstream first transport roller pair 36, and the like as the first transport unit that transports the medium M during image formation by the printing unit 20, and the middle roller 33, the driven roller 34, and the like as the second transport unit that transports the medium M during image reading by the reading unit 90. For this reason, in the printing apparatus 11 of the present example, it is possible to transport the medium M under optimum conditions at each of the time of image formation and the time of reading. In addition, transport accuracy when transporting the medium M during image formation needs to be increased, but transport accuracy when transporting the medium M during reading does not need to be increased, therefore, by separating the first transport unit and the second transport unit as the transport unit 31, it is possible to simplify and reducing costs of the second transport unit. Note that the determination accuracy of the operation state of the printing unit 20 tends to be reduced by simplifying and reducing costs of the second transport unit, but since the extending direction of the reading unit 90 is inclined with respect to the width direction, it is possible to suppress the reduction in the determination accuracy of the operation state of the printing unit 20.

In addition, when each of the first transport unit and the second transport unit is formed by a plurality of roller pairs or the like, a configuration may be adopted in which some roller pairs serve as both the first transport unit and the second transport unit. In the printing apparatus 11 of the present example, the upstream transport roller pair 35 serves as the first transport unit as described above, but can also be regarded as partially serving as the second transport unit.

In addition, in the printing apparatus 11 of the present example, as the transport direction, the forward feeding direction D1 which is a first transport direction by the first transport unit during image formation by the printing unit 20 and the backward feeding direction D2 which is a second transport direction opposite to the forward feeding direction D1 are present. Then, the second transport unit transports the medium M in the backward feeding direction D2 during image reading by the reading unit 90. With such a configuration, an increase in size of the printing apparatus 11 of the present example is suppressed. In the case of such a configuration, since transport accuracy during image reading is likely to decrease, the determination accuracy of the operation state of the printing unit 20 tends to decrease, however, since the extending direction of the reading unit 90 is inclined with respect to the width direction, it is possible to suppress a decrease in the determination accuracy of the operation state of the printing unit 20.

Additionally, as described above, in the printing apparatus 11 of the present example, the printing unit 20 can form the test pattern TP which is the operation check image for checking operation of the printing unit 20 as an image for determining the operation state of the printing unit 20. Then, the printing apparatus 11 of the present example includes the control unit 58 as the processing unit that generates the read image I0, which is the operation check image data for the test pattern TP printed by the printing unit 20, from the test pattern TP read by the reading unit 90. Therefore, the printing apparatus 11 of the present example can automatically generate the read image I0 as the operation check image data by the control unit 58 as the processing unit, and can determine the operation state of the printing unit 20 based on the read image I0. Therefore, it is possible to reduce a load on the user for determining the operation state of the printing unit 20.

Additionally, as described above, in the printing apparatus 11 of the present example, the printing unit 20 can form the transport accuracy check image FP for checking the transport accuracy of the transport unit 31 as the test pattern TP, and the control unit 58 as the processing unit can generate the transport accuracy check read image IFP0 which is transport data from the transport accuracy check image FP read by the reading unit 90 and correct the read image I0 which is the operation check image data to obtain the read image I1 based on the transport accuracy check read image IFP0. Therefore, in the printing apparatus 11 of the present example, since the control unit 58 as the processing unit corrects the read image IC) to obtain the read image I1 while determining whether the transport of the medium M is unstable during image reading or not from the transport accuracy check image FP, it is possible to correct the read image I0 even when the transport of the medium M is unstable. Therefore, it is possible to accurately determine the operation state of the printing unit 20 based on the read image I1 which is the corrected operation check image data.

Additionally, as described above, in the printing apparatus 11 of the present example, the reading elements 91 are arranged in the extending direction in the reading unit 90. Then, as illustrated in FIG. 5, the transport accuracy check image FP has, in the transport direction, a plurality of the transport accuracy check images FP as linear images extending in the width direction. Here, the transport accuracy check image FP as one linear image has a length readable by the plurality of reading elements 91. With such a configuration, it is possible to determine whether the transport of the medium M is unstable or not with high accuracy based on the transport accuracy check image FP.

In addition, as described above, in the printing apparatus 11 of the present example, the printing unit 20 includes the plurality of nozzles 23 which discharge ink onto the medium M, and the test pattern TP which is the operation check image includes the nozzle check pattern NP with which it is possible to check that ink is discharged from each of the nozzles 23. With such a configuration and control, when the printing unit 20 has a configuration similar to that of the printing apparatus 11 of the present example having the plurality of nozzles 23, it is possible to determine, with high accuracy, presence or absence of nozzle omission which is a decrease in the operation state of the printing unit 20 in which ink is not appropriately discharged from the nozzle 23 or not.

In addition, in the printing apparatus 11 of the present example, the control unit 58 also serves as a determination unit that determines the operation state of the printing unit 20 from the read image I0 and the read image I1 as the operation check image data. For this reason, in the printing apparatus 11 of the present example, it is possible to cause the control unit 58 as the determination unit to automatically determine the operation state of the printing unit 20 based on the read image I0 and the read image I1 as the operation check image data generated by the control unit 58 as the processing unit.

The present disclosure is not limited to the present example described above, and can be realized in various configurations without departing from the gist of the present disclosure. Further, appropriate replacements or combinations may be made to the technical features in the present example which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

For example, transport data related to a transport condition of the transport unit 31 may be stored in a memory unit such as the memory 582, and the processing unit may generate the operation check image data based on the transport data. With this configuration, it is possible to generate the operation check image data with high accuracy based on the transport data stored in the memory unit.

What is claimed is:

1. A printing apparatus, comprising:

a transport unit configured to transport a medium in a transport direction;

a printing unit configured to form an image on the medium;

a processing unit; and a reading unit extended in an extending direction intersecting the transport direction and configured to read the image formed on the medium, wherein the extending direction is inclined with respect to a width direction orthogonal to the transport direction, the printing unit is configured to form an operation check image for checking operation of the printing unit as the image, the processing unit generates operation check image data for the operation check image printed by the printing unit from the operation check image read by the reading unit, the printing unit is configured to form a transport accuracy check image for checking transport accuracy of the transport unit as the image, and the processing unit generates transport data from the transport accuracy check image read by the reading unit and corrects the operation check image data based on the transport data.

2. The printing apparatus according to claim 1, wherein the transport unit includes a first transport unit that transports the medium during image formation by the printing unit, and a second transport unit that transports the medium during image reading in the reading unit.

3. The printing apparatus according to claim 2, wherein as the transport direction, a first transport direction by the first transport unit during image formation by the printing unit and a second transport direction which is an opposite direction to the first transport direction are present, and the second transport unit transports the medium in the second transport direction during image reading by the reading unit.

4. The printing apparatus according to claim 1, wherein the reading unit includes a plurality of reading elements arranged in the extending direction, the transport accuracy check image includes, in the transport direction, a plurality of linear images extending in the width direction, and one of the linear images has a length readable by the plurality of the reading elements.

5. The printing apparatus according to claim 1, wherein the printing unit includes a plurality of nozzles that discharge ink onto the medium, and the operation check image includes a nozzle check pattern that enables checking of discharge of the ink from each of the nozzles.

6. The printing apparatus according to claim 1, further comprising a determination unit configured to determine an operation state of the printing unit from the operation check image data.

7. The printing apparatus according to claim 1, further comprising a memory unit configured to store transport data related to a transport condition of the transport unit, wherein the processing unit generates the operation check image data based on the transport data stored in the memory unit.

* * * * *